(12) United States Patent
Nakaya et al.

(10) Patent No.: US 8,393,642 B2
(45) Date of Patent: Mar. 12, 2013

(54) REAR STRUCTURE OF VEHICLE

(75) Inventors: Kouichi Nakaya, Hiroshima (JP);
Akihiro Kobayashi, Hiroshima (JP);
Motoharu Hirata, Hiroshima (JP)

(73) Assignee: Mazda Motor Corporation (JP)

( * ) Notice: Subject to any disclaimer, the term of this patent is extended or adjusted under 35 U.S.C. 154(b) by 143 days.

(21) Appl. No.: 13/024,868

(22) Filed: Feb. 10, 2011

(65) Prior Publication Data

US 2011/0215555 A1  Sep. 8, 2011

(30) Foreign Application Priority Data

Mar. 5, 2010  (JP) .................................. 2010-049569

(51) Int. Cl.
*B60N 2/427*  (2006.01)
*B60R 21/00*  (2006.01)
(52) U.S. Cl. ............... 280/751; 297/216.12; 280/730.1; 180/271
(58) Field of Classification Search ............... 297/216.1, 297/216.12, 216.14, 216.16; 280/730.1, 280/751; 180/271, 290
See application file for complete search history.

(56) References Cited

U.S. PATENT DOCUMENTS

| | | | | |
|---|---|---|---|---|
| 5,927,804 A * | 7/1999 | Cuevas | ..................... | 297/216.12 |
| 6,019,424 A * | 2/2000 | Ruckert et al. | ........... | 297/216.12 |
| 6,050,633 A * | 4/2000 | Droual | ............................ | 297/61 |
| 6,135,561 A * | 10/2000 | Kruger et al. | .................. | 297/408 |
| 6,179,379 B1 * | 1/2001 | Andersson | ............... | 297/216.13 |
| 6,336,670 B1 * | 1/2002 | Savås | ........................ | 296/37.16 |
| 6,523,892 B1 * | 2/2003 | Kage et al. | ............... | 297/216.13 |
| 6,550,865 B2 * | 4/2003 | Cho | .............................. | 297/408 |
| 6,789,846 B2 * | 9/2004 | Humer et al. | ............. | 297/216.12 |
| 6,840,560 B2 * | 1/2005 | Flogard | ........................ | 296/68.1 |
| 6,899,367 B1 * | 5/2005 | Plavetich et al. | .......... | 296/65.13 |
| 7,145,263 B2 * | 12/2006 | Nathan et al. | ................ | 307/10.1 |
| 7,185,950 B2 * | 3/2007 | Pettersson et al. | ....... | 297/216.12 |
| 7,364,185 B2 * | 4/2008 | Mori et al. | .................. | 280/730.1 |
| 7,484,808 B2 * | 2/2009 | Yetukuri et al. | .............. | 297/408 |
| 7,699,394 B2 * | 4/2010 | Humer et al. | ............. | 297/216.12 |
| 7,823,971 B2 * | 11/2010 | Humer et al. | ............. | 297/216.12 |
| 7,963,601 B2 * | 6/2011 | Humer et al. | ............. | 297/216.12 |
| 8,191,965 B2 * | 6/2012 | Okimura et al. | ......... | 297/216.12 |
| 2004/0066022 A1 | 4/2004 | Mori et al. | | |
| 2007/0013201 A1 * | 1/2007 | Wagner et al. | ............. | 296/24.43 |
| 2011/0109130 A1 * | 5/2011 | Nakaya et al. | ........... | 297/188.04 |
| 2011/0109132 A1 * | 5/2011 | Nakaya et al. | ........... | 297/216.12 |

FOREIGN PATENT DOCUMENTS

JP  2007-296944 A  11/2007

* cited by examiner

*Primary Examiner* — Joseph Rocca
*Assistant Examiner* — Timothy Wilhelm
(74) *Attorney, Agent, or Firm* — Studebaker & Brackett PC; Donald R. Studebaker

(57) ABSTRACT

A seat is arranged in front of a back door. An airbag is configured to inflate into a space between the seat and the back door in a rear collision of a vehicle. Herein, when a lower frame portion of a headrest support structure body receives a rearward load in the rear collision of the vehicle, an upper frame portion of the headrest support structure body is moved forwardly around a rotational point of connecting members which pivotally connect an upper portion of the headrest support structure body to the vehicle-body side wall. Accordingly, a headrest attached to the upper frame portion is moved forwardly so that the space between the headrest and the back door can be expanded longitudinally and the passenger's head portion can be supported securely.

4 Claims, 13 Drawing Sheets

REAR STRUCTURE OF VEHICLE

BACKGROUND OF THE INVENTION

The present invention relates to a rear structure of a vehicle equipped with an airbag device.

Conventionally, vehicles, such an automotive vehicle, have been developed to prevent a rearward move of a passenger seated in a rear seat provided in front of a rear vertical-wall portion at a rear end portion of a vehicle in a vehicle rear collision for the protection of the passenger.

For example, US Patent Application Publication No. 2004/0066022 discloses a vehicle structure, in which an airbag device is provided at an upper portion of the rear end portion of the vehicle and this airbag device inflates an airbag into a space between the rear vertical-wall portion and the rear seat in the vehicle rear collision in order to prevent the rearward move of the passenger seated in the rear seat. Further, this discloses another structure in which a seatback of the rear seat is rotated (inclined) forwardly by an electric actuator in order to prevent the rearward move of the passenger.

Meanwhile, Japanese Patent Laid-Open Publication No. 2007-296944 discloses a vehicle structure, in which the rear seat is moved forwardly by a cylinder device so that the space between the rear seat and the rear vertical-wall portion can be expanded in advance to an inflation of the airbag in order to inflate the airbag securely between the rear seat and the rear vertical-wall portion in the vehicle rear collision.

However, the structures disclosed in the above-described publications merely aimed at the prevention of the rearward move of the passenger seated in the rear seat in the vehicle rear collision, but not properly considered a secure support of a head portion of the passenger in the vehicle rear collision for the protection of the passenger's head portion.

SUMMARY OF THE INVENTION

The present invention has been devised in view of the above-described matter, and an object of the present invention is to provide a rear structure of a vehicle equipped with the airbag device which can securely inflate the airbag into the space between the rear vertical-wall portion at the rear end portion of the vehicle and the rear seat provided in front of the rear vertical-wall portion, and also effectively protect the head portion of the passenger in the vehicle rear collision.

According to the present invention, there is provided a rear structure of a vehicle, comprising a rear vertical-wall portion provided at a rear end portion of the vehicle, a seat provided in front of the rear vertical-wall portion, the seat comprising a seatback and a headrest provided above the seatback, an airbag device provided at an upper portion of the rear end portion of the vehicle and inflating an airbag into a space between the seat and the rear vertical-wall portion in a vehicle rear collision, a pressure-receiving portion provided at the seatback of the seat and receiving a load caused by a rearward move of a passenger seated in the seat in the vehicle rear collision, a connection portion connecting the pressure-receiving portion and the headrest of the seat, and a headrest-moving mechanism portion associated with the connection portion so as to allow a rearward move of the pressure-receiving portion in accordance with the rearward move of the passenger in the vehicle rear collision and move the headrest of the seat forwardly in accordance with the rearward move of the pressure-receiving portion.

According to the present invention, the headrest can be moved forwardly in the vehicle rear collision, so that the space between the headrest and rear vertical-wall portion can be expanded longitudinally, and the passenger's head portion can be securely supported. Thereby, the airbag can be securely inflated into the space between the rear vertical-wall portion and the headrest so that the rearward move of the passenger can be prevented properly, and the passenger's head portion can be protected effectively.

According to an embodiment of the present invention, the seat comprises plural sitting portions in a vehicle width direction and plural headrests corresponding to the sitting portions, the pressure-receiving portion is common to any passenger seated on the plural sitting portions of the seat so as to receive the load caused by the rearward move of any one of the passengers seated in the seat, the connection portion is common to the plural headrests so as to connect the common pressure-receiving portion and the plural headrests of the seat, and the headrest-moving mechanism portion moves the plural headrests of the seat forwardly via the common connection portion when the common pressure-receiving portion receives the rearward load from any one of the passengers seated on the plural sitting portions of the seat in the vehicle rear collision. Thereby, even in case a single passenger is seated in the rear seat which is available for the plural passengers, all of the headrests can be moved forwardly in the vehicle rear collision. Accordingly, the airbag can be securely inflated into the space between the rear vertical-wall portion and the headrests, and the passenger's head portion can be protected effectively in this case as well.

According to another embodiment of the present invention, the headrest-moving mechanism portion connects the connection portion and a vehicle body rotatably via a connecting member within a range between a middle portion, in a vertical direction, of the seatback and an upper end portion of the seatback when the seatback is in a rising state for use. Thereby, the seatback can be restrained greatly from inclining rearwardly in the vehicle rear collision, so that the rearward load caused by the rearward move of the passenger in the vehicle rear collision can be made positively act on the pressure-receiving portion and thereby the rearward move of the pressure-receiving portion can be promoted. Accordingly, the headrest can be moved forwardly promptly in the vehicle rear collision, so that the airbag can be securely inflated into the space between the rear vertical-wall portion and the headrest and also the passenger's head portion can be protected effectively.

According to another embodiment of the present invention, a baggage room is provided behind the seat, a partition wall is provided behind the seat and in front of the baggage room, and a space to allow a rearward move of the pressure-receiving portion and/or the connection portion is provided between the partition wall and the seat. Thereby, it can be prevented that operations of the pressure-receiving portion and the connection portion are hindered by a move of any baggage in the baggage room and the like, so that the forward move of the headrest can be securely achieved. Accordingly, the airbag can be securely inflated into the space between the rear vertical-wall portion and the headrest and also the passenger's head portion can be protected effectively.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
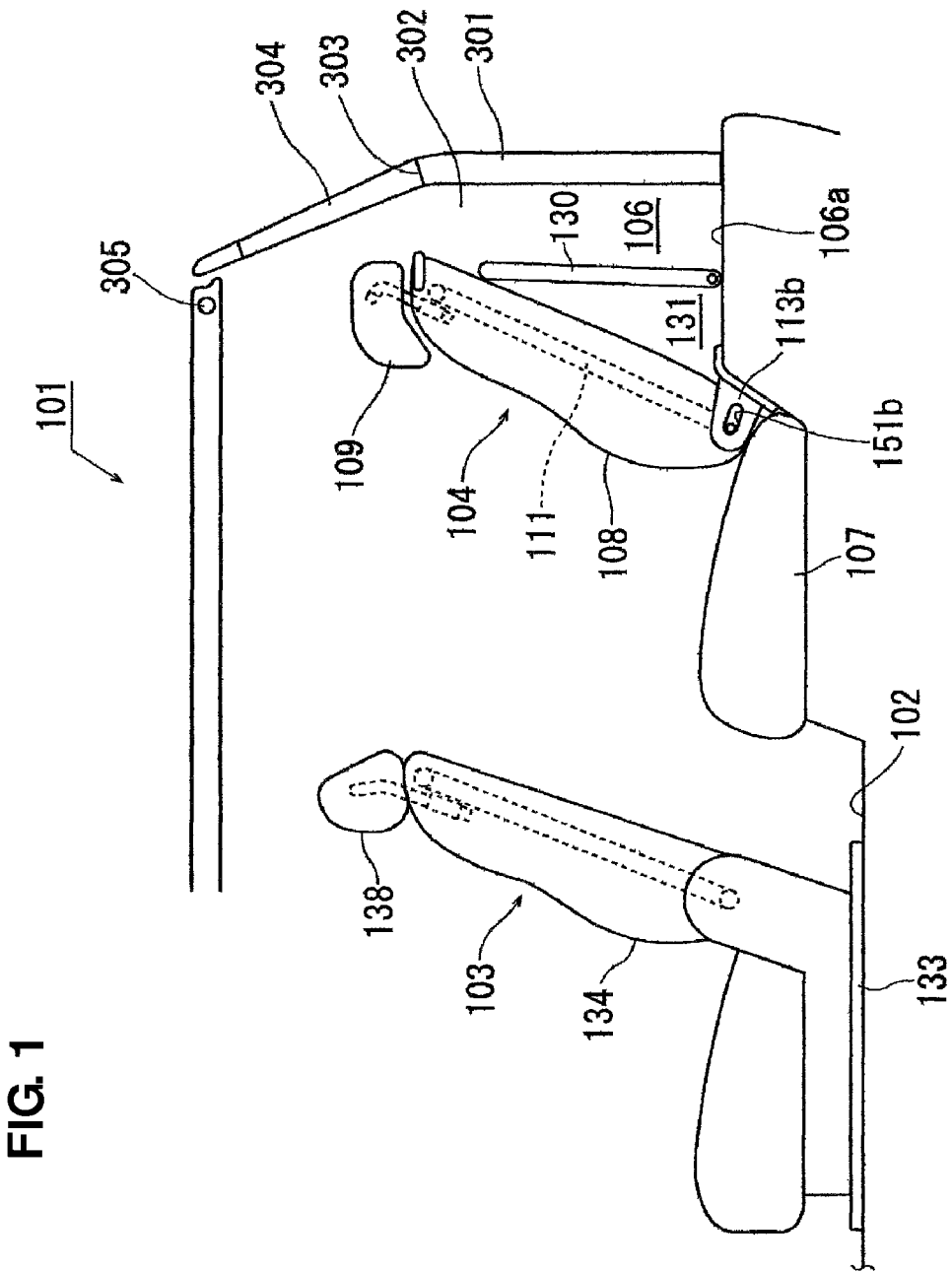
FIG. 1 is a diagram showing an interior structure of a vehicle to which a rear structure according a first embodiment is applied.

FIG. 1 shows an interior structure of a vehicle 101, to which a rear structure according to a first embodiment of the present invention is applied. This vehicle 101 is a so-called minivan type of vehicle and equipped with a back door 301, as a rear vertical-wall portion, which is provided at a rear end portion of the vehicle. An upper end portion of the back door 301 is rotatably supported via a door hinge, not illustrated, at an upper portion of the rear end portion of the vehicle so that a back-door opening 302 formed at a rear portion of a vehicle body is opened or closed by this back door 301. At an upper half of the back door 301 is formed a back-window opening 303 which is of a trapezoid shape with its longer lower side. A back-window glass 304 is fixed to the back-window opening 303.

On a floor panel 102 forming a bottom portion of a vehicle room of the vehicle 101 are arranged a front-row seat 103 which comprises a driver's seat and an assistant's seat (passenger's seat) and a seat for passenger 104 which is provided in back of the front-row seat 103 as shown in FIG. 1. The seat for passenger 104 is a rearmost seat and arranged in front of and in the vicinity of the back door 301. A pair of vehicle-body side walls (vehicle-body wall portions) 105, which is comprised of side panels of the vehicle 101, is provided on both sides (outward sides), in the seat width direction (in a right-and-left direction), of the seat for passenger 104. A baggage room 106 is formed behind the seat for passenger 104, and its bottom portion 106a extends rearwardly from the vicinity of a seatback lower end portion of the seat for passenger 104.

Figure 2:
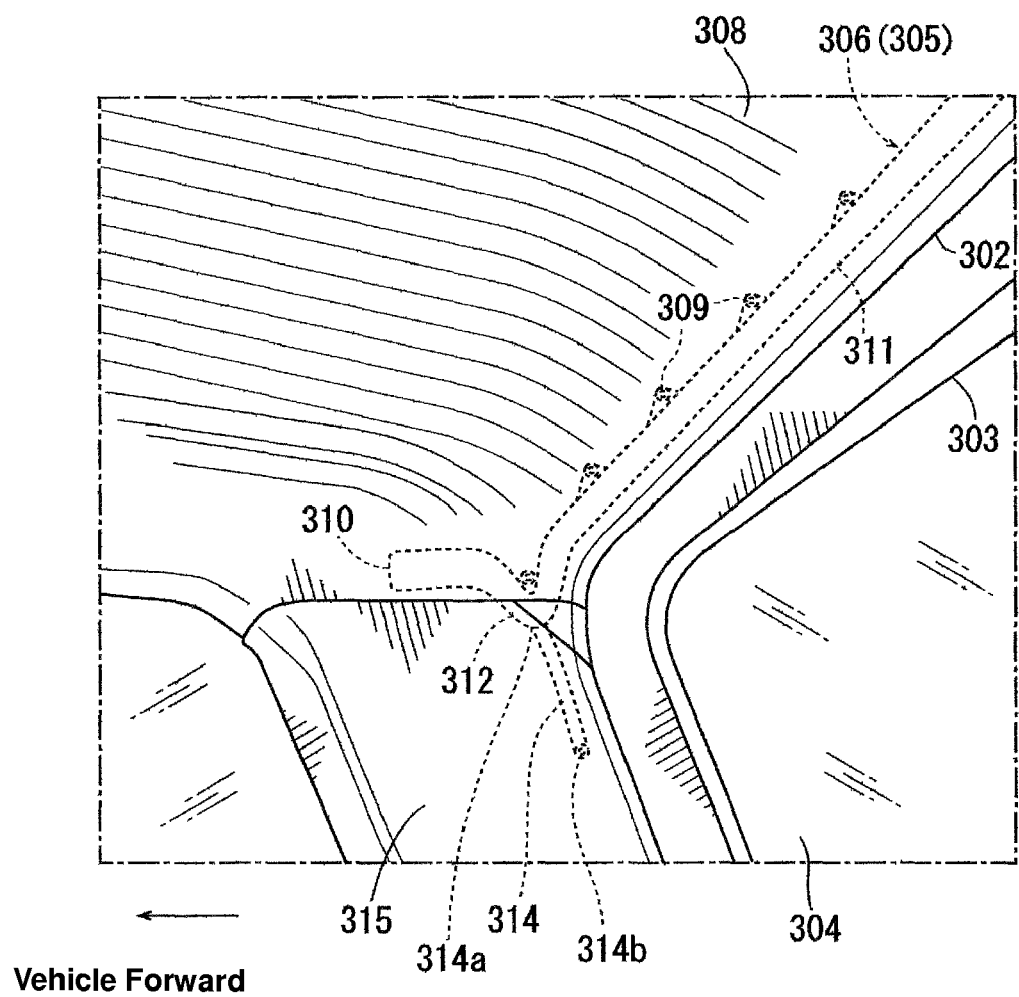
FIG. 2 is a perspective view showing an arrangement of an airbag, when viewed from the inside of a vehicle room.
Figure 3:
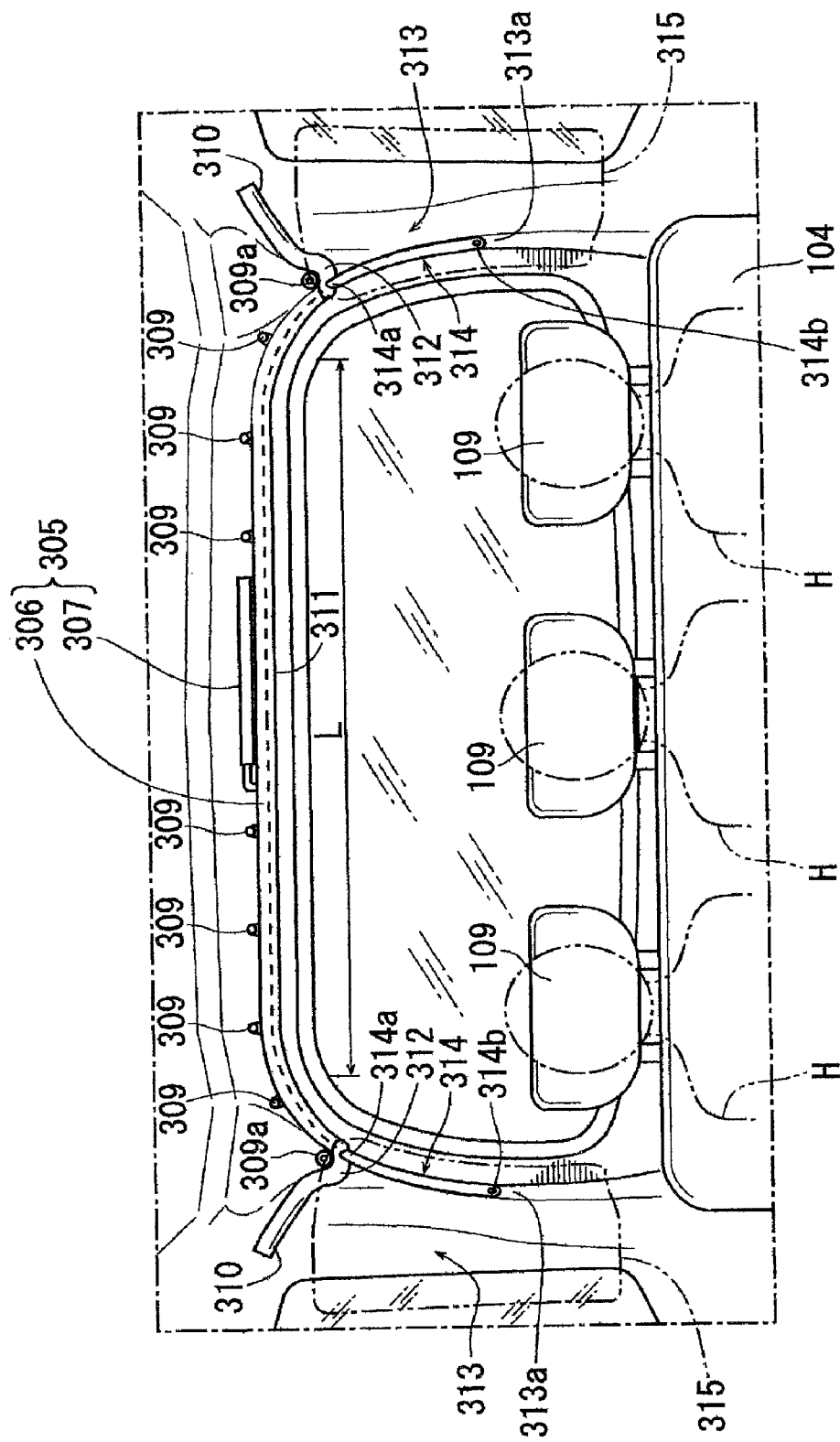
FIG. 3 is a front view showing the arrangement of the airbag in a state in which a roof trim is removed, when viewed from the front side of a vehicle body.
Figure 4:
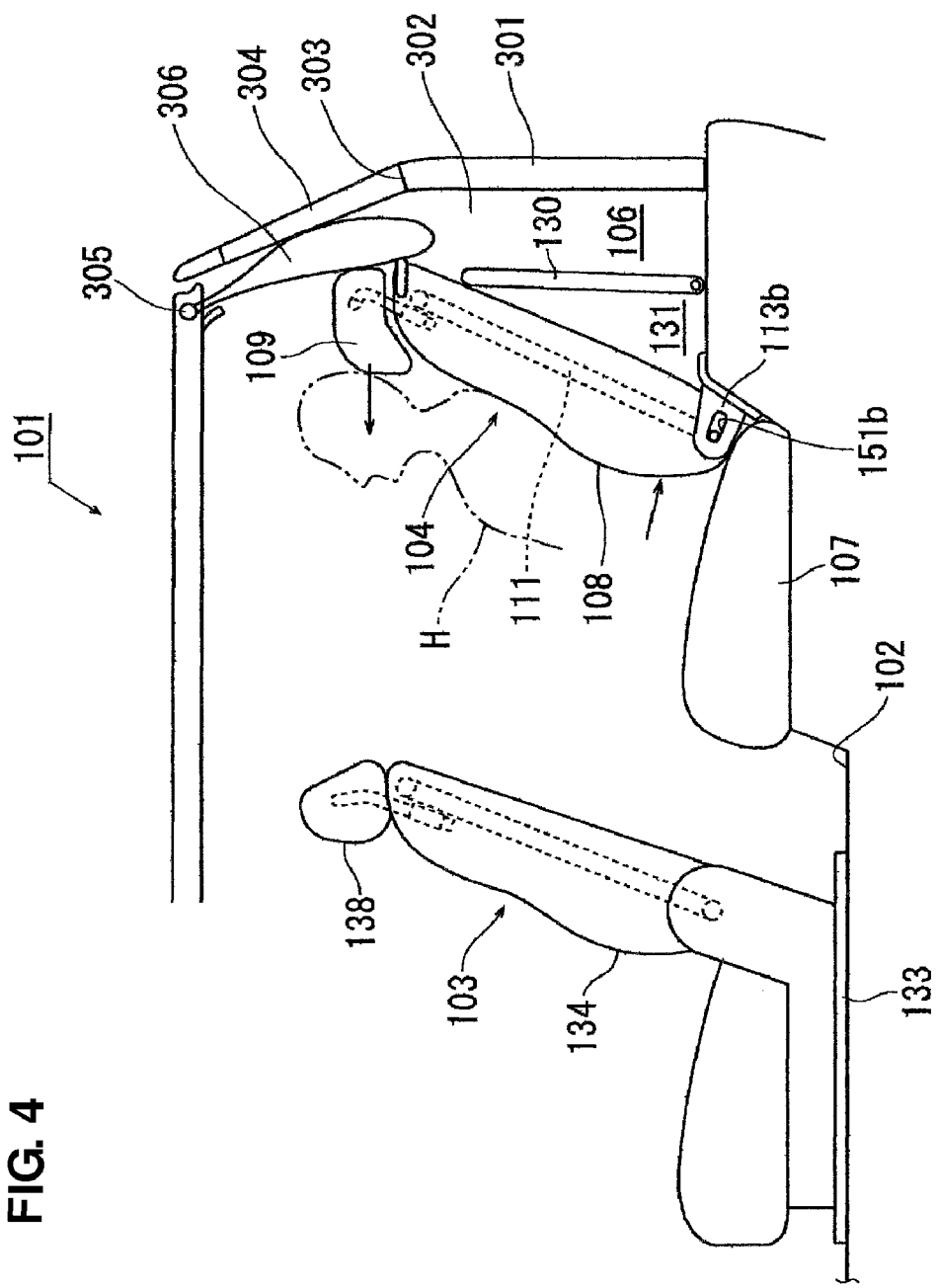
FIG. 4 is an explanatory diagram showing a state in which the airbag is inflated in the state of FIG. 1.
Figure 5:
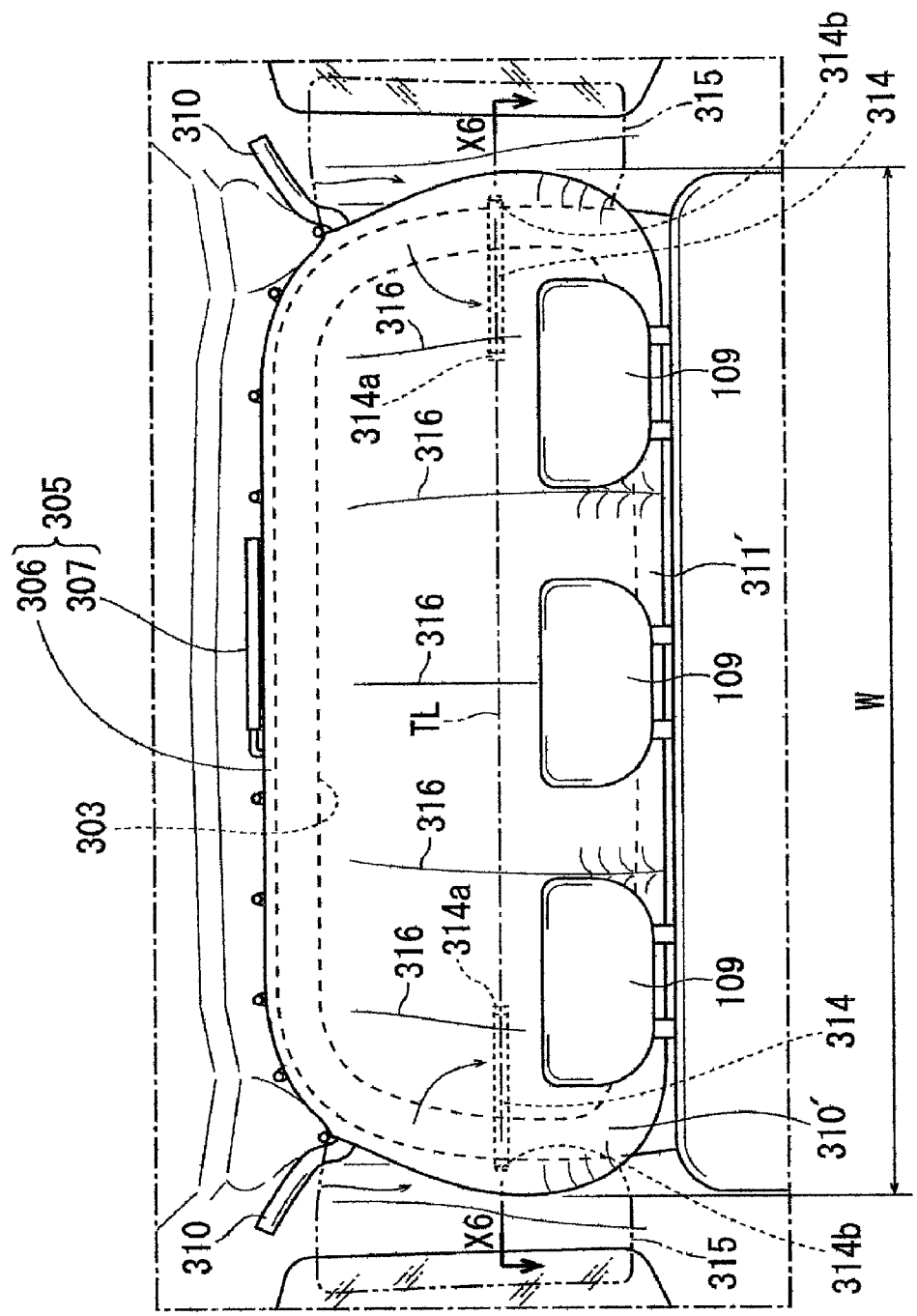
FIG. 5 is a front view showing a state in which the airbag is inflated in the state of FIG. 3.

An airbag device 305 is, as shown in FIGS. 1 through 3, provided at an upper edge portion of the back-door opening 302. The airbag device 305 comprises an airbag 306 which is stored so as to extend in the vehicle width direction at the upper edge portion of the back-door opening 302 and an inflator 307 which supplies gas into the airbag 306 in a vehicle rear collision. The airbag device 305 inflates the airbag 306 in a curtain shape downwardly toward a space between the seat for passenger 104 and the back door 301 when detecting an impact of the vehicle rear collision as shown in FIGS. 4 and 5. Thereby, the upper half of the back-window opening 302 is covered with this inflated airbag 306. The airbag 306 in its storage state is arranged so as to be hidden by a roof trim 308 which forms a ceiling portion of the vehicle room as shown in FIG. 2. Herein, the roof trim 308 is made of a soft resin-made board member, so that it deforms so easily that the airbag 306 is not prevented from inflating smoothly by this roof trim 308. FIG. 3 shows a state in which the roof trim 308 is removed for easy recognition regarding the arrangement of the airbag 306.

Specifically, the airbag 306 in the storage state is firmly fixed only to the upper edge portion of the back-door opening 302 via plural attaching flanges 309 . . . . This airbag 306 has bending portions 310 at its both end portions in its extensive direction (vehicle width direction) and a body portion 311 between the both bending portions 310. An entire width, in the vehicle width direction, of the airbag 306 is slightly longer than a length L of an upper side of the back-window opening 303. Each bending portion 310 has a turn portion 312 which turns slightly downwardly, which is fixed to the vehicle body via an attaching flange 309a. The both bending portions 310, 310 are set to be directed forwardly at upper portions of D pillars 313, 313 which extend vertically and form both side edges of the back-door opening 302.

The above-described inflator 307 is, as shown in FIG. 3, disposed at a central position, in the vehicle width direction, above the airbag 306 in the storage state. The inflator 307 is formed in a substantially circular cylindrical shape, and disposed in such a manner that its axis extends in the vehicle width direction. The inflator 307 generates gas when receiving an operational signal from a controller, not illustrated, by detection of the vehicle rear collision and supplies the gas generated into the airbag 306.

Further, a string-shaped connecting tether member 314 is provided so as to extend vertically between the airbag 306 and a middle portion, in a vehicle vertical direction, of the D pillar 313 as shown in FIG. 3. An upper end (one end) of the connecting tether member 314 is fixed to the turn portion 312 of the airbag 306, and a lower end (the other end) of the connecting tether member 314 is fixed to a portion (313a) slightly below the middle position, in the vehicle vertical direction, of the D pillar 313. Herein, a pillar trim 315 which covers the D pillar 313 and the connecting tether member 314 is arranged on the vehicle inside of the D pillar 313 as shown by a one-dotted broken line in FIGS. 3 and 5.

Figure 7:
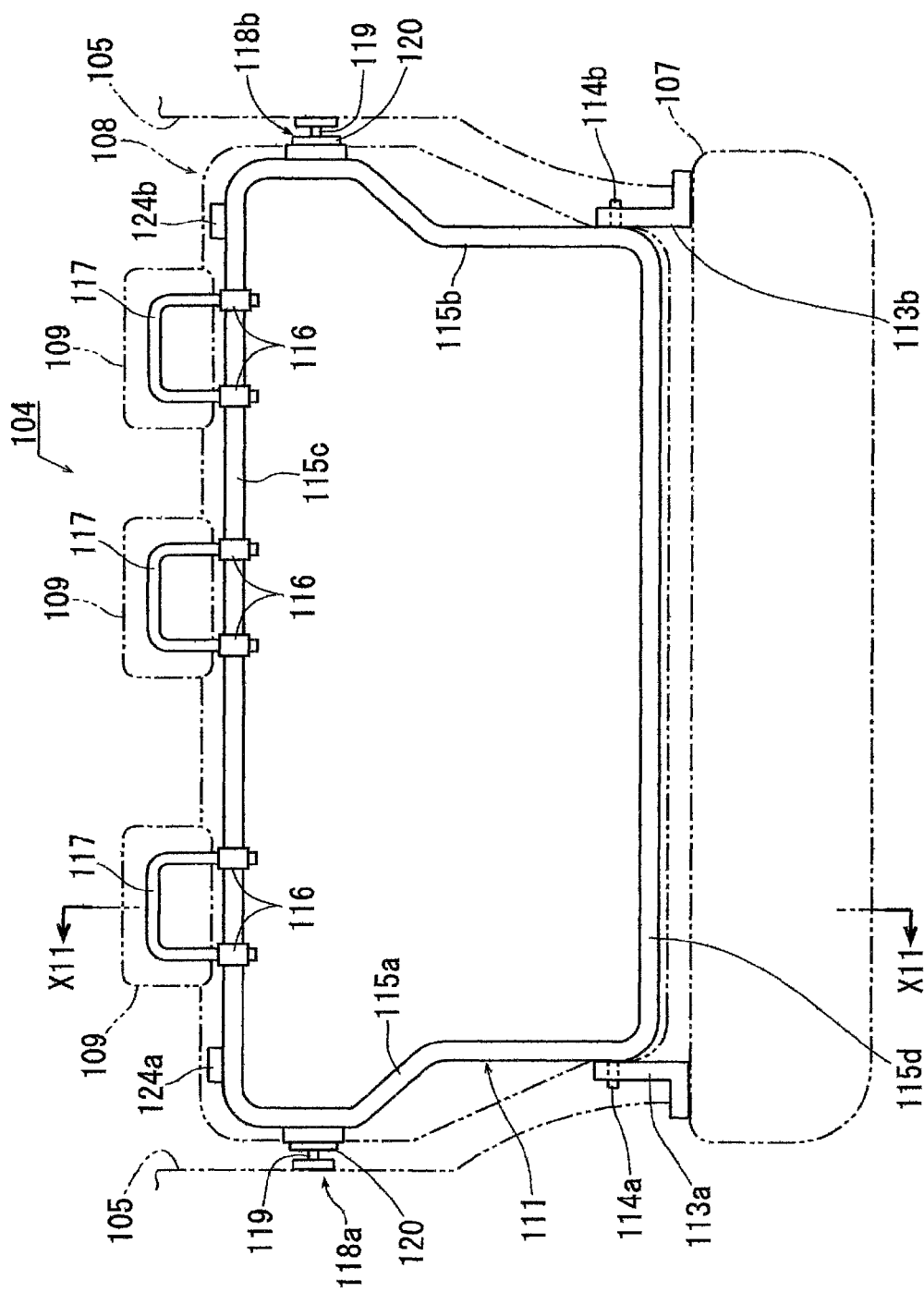
FIG. 7 is an elevational view showing an inner structure of a seat for passenger according to the first embodiment.

The seat for passenger 104 is a bench type of seat, which comprises a common seat cushion 107 which is available for plural passengers H and a common seatback 108 which rises from a rear end portion of the seat cushion 107 as shown in FIGS. 3 and 7. The common seatback 108 of the present embodiment has the width available for three passengers H (the sitting portion for three), and it has headrests 109 for respective passengers at its upper end portion.

A headrest support structure body 111 is provided in the seatback 108 as shown in FIG. 7. The headrest support structure body 111 is arranged along a contour of the seatback 108 and reinforces an area from a lower portion to an upper portion of the seatback 108. The headrest support structure body 111 of the present embodiment is made of a circular-pipe-made seatback frame (denoted by reference numeral 111 which is the same as that for the headrest support structure body) which is bent as illustrated. The seatback frame 111 comprises a pair of right-and-left side frame portions 115a, 115b, an upper frame portion 115c which interconnects upper end portions of the side frame portions 115a, 115b, and a lower frame portion 116d which interconnects lower end portions of the side frame portions 115a, 115b.

The above-described lower frame portion 115d constitutes a pressure-receiving portion of the present invention. Thus, the lower frame portion 115d extends over a substantially entire width of the seatback 108 at a lower portion of the seatback 108, and its height position is located at around a waist portion of the passenger seated on the seat cushion 107 in order to receive a load caused by the rearward move of the passenger in the vehicle rear collision.

The pair of side frame portions 115a, 115b and the upper frame portion 115c constitute a connection portion of the present invention. Thus, the pair of side frame portions 115a, 115b and the upper frame portion 115c have a connection relationship with the lower frame portion 115d constituting the pressure-receiving portion, three sets of holding cylinders 116 are provided at the upper frame portion 115c, and support bars 117 of each of the headrests 109 are inserted into and held by the holding cylinders 116.

In this case, in the vehicle 101 which has a projection portion at a lower portion of the vehicle-body side wall 105 corresponding to a tire house and the like, as shown in FIG. 7, an outside lower portion of the seatback 108 is concaved inwardly to avoid any interference with the projection portion, and an outside side frame portion 12aA of the headrest support structure body 111 is formed accordingly so that the width of the lower portion (lower frame portion 115d) of the headrest support structure body 111 is smaller than that of its upper portion (upper frame portion 116c). Herein, it is preferable that the headrest support structure body 111 be comprised of not only the circular-pipe-made seatback frame but a back panel, not illustrated, provided therein along with this seatback frame. This is because this back panel restrains a move of any baggage in the baggage room 106 in the frontal collision of the vehicle 101, so that it can be properly restrained that the baggage has bad influence on the passenger seated in the seat for passenger 104. Of course, the headrest support structure body 111 may be comprised of only the seatback frame as shown in the present embodiment, both of the seatback frame and the back panel, or only the back panel. In any case, the same function can be performed.

Figure 8:
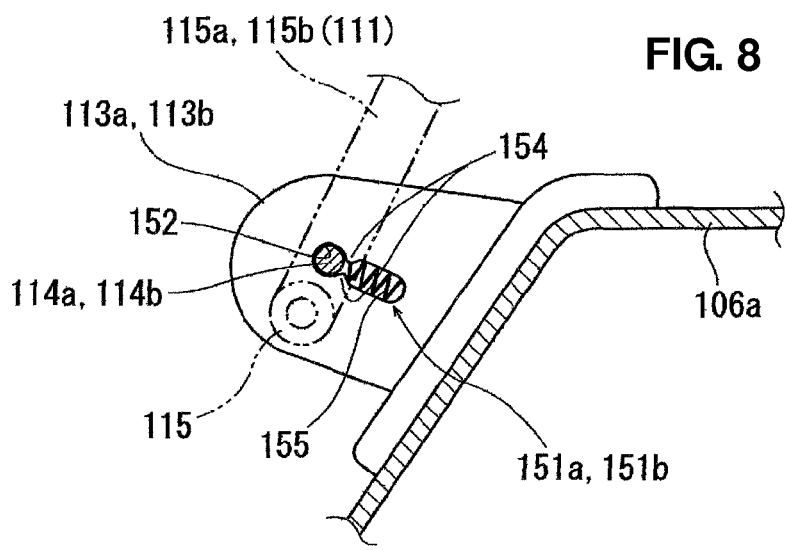
FIG. 8 is an explanatory diagram showing a structure of a seat bracket.

The headrest support structure body 111 is, as shown in FIGS. 7 and 8, is fixed to the floor panel 102 via a right-and-left seat brackets 113a, 113b at its lower portion. The seat brackets 113a, 113b are fixed to the floor panel 102 at both sides of the headrest support structure body 111. Meanwhile, lower portions of the side frame portions 115a, 115b of the headrest support structure body 111 have support axes 114a, 114b which project outwardly, respectively. The lower portion of the headrest support structure body 111 is pivotally supported at the seat brackets 113a, 113b via the support axes 114a, 114b. Accordingly, the seatback 108 can take its rising state (position) and its folding (falling) state (position).

Figure 10:
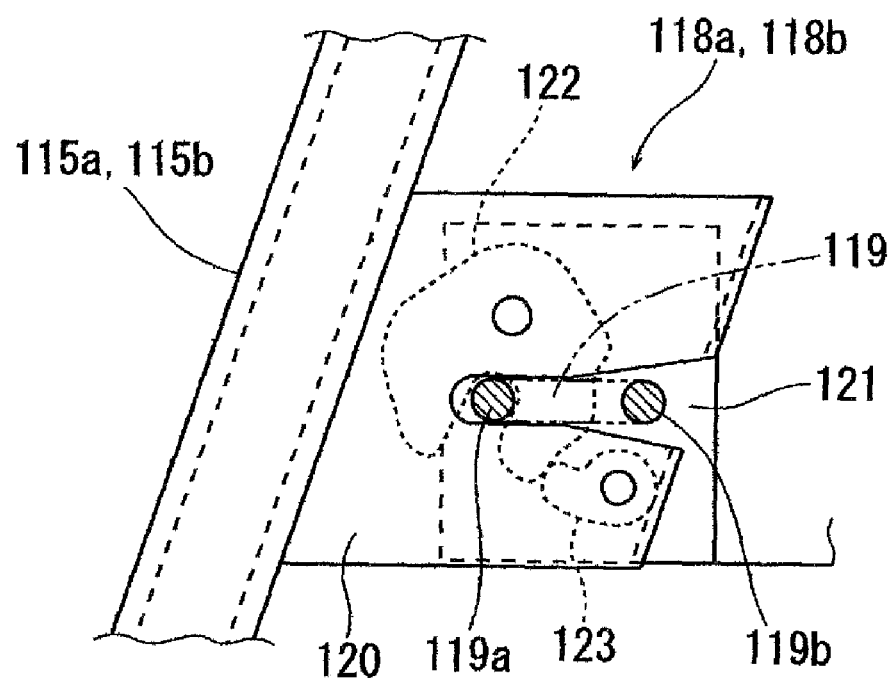
FIG. 10 is an explanatory diagram showing a state of connection (engagement) between the striker and the lock bracket.

The both side frame portions 115a, 115b of the headrest support structure body 111 and the both side walls 105 of the vehicle body are connected via connecting members 118a, 118b as shown in FIGS. 7, 8 and 10. Herein, the connecting member 118a (118b) is comprised of a member which functions so that the headrest support structure body 111 can rotate relative to the vehicle-body side wall 105 around the connecting member 118a (118b) (around a rotational axis in the vehicle width direction). In the present embodiment, a striker 119 and a lock bracket 120 as a catcher are used as this connecting member 118a (118b). The striker 119 is made of a U-shaped member, which is attached to the vehicle-body side wall 105 and projects inwardly, in the vehicle width direction, from the vehicle-body side wall 105. The lock bracket 120 is attached to the side frame portion 115a (115b) of the headrest support structure body 111, and receives the striker 119 so that a rotatable relationship with the striker 119 within in a specified range can be secured. The connection (engagement) between the striker 119 and the lock bracket 120 restricts the rotation of the headrest support structure body 111 around the lower support axes 114a, 114b, so that the headrest support structure body 111 takes a specified rising state and the headrest 109 is located at a specified position. In this case, the connection between the striker 119 and the lock bracket 120 is conducted in the normal use state of the seatback 108 in a range from the substantially middle portion to the upper end portion of the seatback 108.

Specifically, the lock bracket 120 comprises a notch portion 121 which receives the striker 119 coming in, a latch 122 which holds the striker 119 in the notch portion 121, and a lock portion 123 which locks the latch 122 at a holding position of the striker 119. When the headrest support structure body 111 equipped with the lock bracket 120 is rotated upwardly around the support axes 114a, 114b, the notch portion 121 of the lock bracket 120 is inserted around the striker 119 at the vehicle-body side wall 105, so that the latch 122 is pushed by the striker 119 and rotated to the holding position of the striker 119, and eventually the latch 122 is restrained at the holding position by the lock portion 123 as shown in FIG. 10. In case the lock bracket 120 and the striker 119 are in the connection state, an axis of an axis portion 119a of the striker 119 coming in to the lock bracket 120 is a rotational axis, while an inlet of the notch portion 121 of the lock bracket 120 is wider than its inner portion so that the smooth rotation is not hindered by interference of another axis portion 119b with an inner wall of the notch portion 121 (see FIG. 10).

Figure 9:
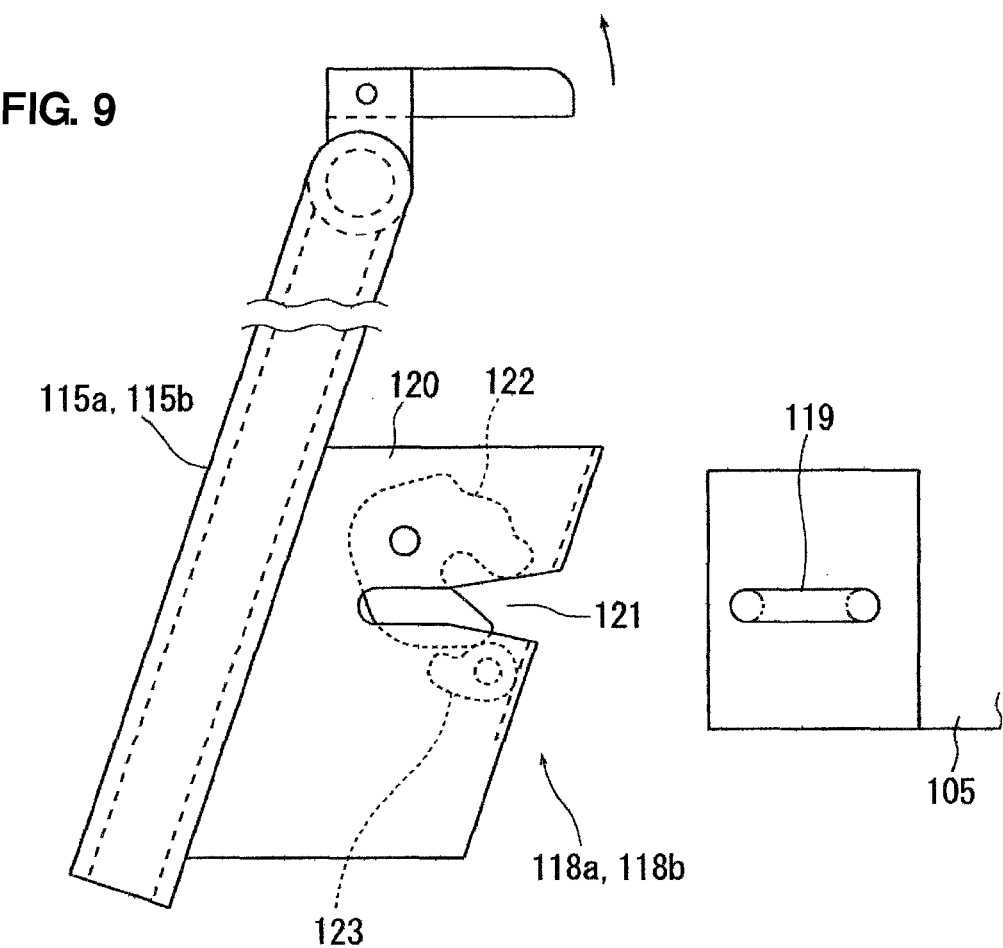
FIG. 9 is an explanatory diagram showing a state of detachment (disengagement) between a striker and a lock bracket.

Meanwhile, lock releasing levers 124a, 124b are provided at both sides of the upper frame portion 115c of the headrest support structure body 111 as shown in FIGS. 7 and 9. These lock releasing levers 124a, 124b are coupled to lock portions 123 of the lock brackets 120 via cables, not illustrated. When any of these lock releasing levers 124a, 124b is operated for lock releasing, the lock portions 123 of the lock brackets 120 are driven to a lock releasing position of the latches 122, so that the lock (engagement) between the strikers 119 and the lock brackets 120 are released. Thereby, if the headrest support structure body 111 is forwardly rotated around the support axes 114a, 114b in this state, the strikers 119 are pulled out of the notch portions 121 of the lock brackets 120, so that the headrest support structure body 111 takes its folding state. Herein, it may be configured that the headrest support structure body 111 can be rotated forwardly to take its folding state only by operating both of the right-and-left lock releasing levers 124a, 124b.

As shown in FIG. 8, rearward move allowing mechanisms 151a, 151b are associated with the side frame portions 115a, 115b as a headrest moving mechanism portion, in addition to the rotatable connection relationship between the striker 119 (vehicle-body side wall 105) and the lock bracket 120. In the present embodiment, the rearward move allowing mechanisms 151a (151b) is provided at the seat bracket 113a (113b) and comprises a support hole 152 which supports the above-described support axis 114a (114b), a slot 153 which is formed behind the support hole 152, projections 154 which are formed between the slot 153 and the support hole 152, and a coil spring 155 which is stored in the slot 153 as a biasing means. The slot 153 extends rearwardly so as to allow a rearward move of the support axis 114a (114b). In the present embodiment, the slot 153 is formed to extend obliquely rearwardly and downwardly, considering a situation where the seatback 108 is generally used in the slant state. The projections 154 narrows a connection passage between the support hole 152 and the slot 153 so that the support axis 114a (114b) can be held inside the support hole 152. Thereby, the support axis 114a (114b) may not move into the slot 153 unless a pushing force large enough to go over the projections 154 is applied to it. The coil spring 155 is stored in the slot 153 in its compressive state, and the rearward move of the support axis 114a (114b) from the support hole 152 to the slot 153 is restrained by a biasing force of the coil spring 155 as well.

In this case, the resistant force of the projections 154 and the biasing force of the coil spring 155 are set by considering the rearward load in the rear collision of the vehicle 101. The headrest support structure body 111 does not move rearwardly in the original state of the seatback 108 even when a load from a waist portion of the passenger acts on the lower frame portion 115d of the headrest support structure body 111. Meanwhile, when the specified large rearward load (see a right-directed arrow in FIG. 11), like that in a situation of the vehicle rear collision, acts on the lower frame portion 115d of the headrest support structure body 111 via the passenger's waist portion, the support axes 114a, 114b move into the slot 153 in accordance with this load against the biasing force of the projections 154 and the biasing force of the coil spring 155. Accordingly, the headrest support structure body 111 rotates (moves) rearwardly around the axis portion 119a of the striker 119 as shown by a phantom line in FIG. 11.

Accordingly, in case no connection relationship between the striker 119 and the lock bracket 120 exists, the lower portion of the headrest support structure body 111 rotates around the support axes 114a, 114b and the seatback 108 rises up or fells down accordingly. Thus, in case of expanding the baggage room 106, the seatback 108 can be fallen down to its holding position. Meanwhile, in case of using that as a normal seat, the seatback 108 is made rise up, and held to its use position by fixing the headrest support structure body 111 of the seatback 108 to the vehicle-body side wall 105 through locking of the striker 119 with the lock bracket 120.

Meanwhile, when the specified rearward load (see the right-directed arrow in FIG. 11) acts on the lower portion (lower frame portion 115d) of the headrest support structure body 111 in accordance with the rearward move of the passenger in the vehicle rear collision, the lower portion of the headrest support structure body 111 moves rearwardly against the resistant force and the biasing force of the rearward move allowing mechanism 151a, 151b. According to this, the headrest 109 and the seatback 108 move (rotate) forwardly around the connecting members 118a, 118b. Thereby, the headrest 109 can securely support the head portion of the passenger and properly restrain the passenger's head portion from moving rearwardly relative to the passenger's back portion. Herein, while the airbag device 305 inflates the airbag 306 into the space between the seat for passenger 104 (especially, the headrest 109 and the head portion of the seated passenger H) and the back door 301 as shown in FIG. 4, since the headrest 109 and the seatback 108 move forwardly as descried above, the space between the seat for passenger 104 and the back door 301 is expanded longitudinally. Accordingly, the airbag 306 can be inflated securely between the seat for passenger 104 and the back door 301. Consequently, the prevention of the rearward move of the passenger H seated in the seat for passenger 104 can be securely achieved. In this case, the tip portion of the airbag 306 may have an inflation state or a non-inflation state.

Particularly, in the present embodiment, the seatback 108 can be made move (swing) forwardly along with the headrest 109. Thus, the airbag 306 can be inflated to a deep position in the space between the seatback 108 and the back door 301. Further, since the upper portions of the side frame portions 115a, 115b of the headrest support structure body 111 are connected to the vehicle-body side wall via the connecting members 118a, 118b and thereby the upper portion of the headrest support structure body 111 is prevented from moving longitudinally, the rearward load according to the rearward move of the passenger in the vehicle rear collision can be made positively act on the lower frame portion 115d of the headrest support structure body 111, so that the rearward move of the lower frame portion 115d as the pressure-receiving portion can be promoted. Consequently, the headrest 109 is moved forwardly in the initial stage of the vehicle rear collision, so that the airbag 306 can be inflated securely between the back door 301 and the headrest 109 and seatback 108, and the passenger's head portion can be protected effectively.

The inflation state of the airbag 306 will be described more specifically. When the vehicle rear collision is detected, the airbag device 305 operates, and the gas is supplied into the airbag 306 from the inflator 307, the airbag 306 inflates into the space between the seat for passenger 104 and the back door 301 as shown in FIG. 4. Herein, as shown in FIG. 5, a portion 310' corresponding to the bend portion 310, in addition to a portion 311' corresponding to the body portion 311 of the airbag 306, also inflates downwardly from the storage position so as to cover over the back window opening 303 perfectly. Especially, since the portion 310' corresponding to the bending portion 310 inflates so as to cover part of the pillar trim 315, the rear portion of the vehicle room is covered with the airbag 306 perfectly.

Herein, the airbag 306 is made of a cloth-made bag member as well known, and inflates largely by receiving the inflatable gas therein. The airbag 306 had five sewing portions 316 . . . which extend vertically from its lower end to its middle position and are arranged at intervals in the vehicle width direction. Therefore, the airbag 306 is divided into six split cylindrical portions 317 . . . in the vehicle width direction, which are interconnected through respective upper portions thereof (see FIGS. 5 and 6).

Figure 6:
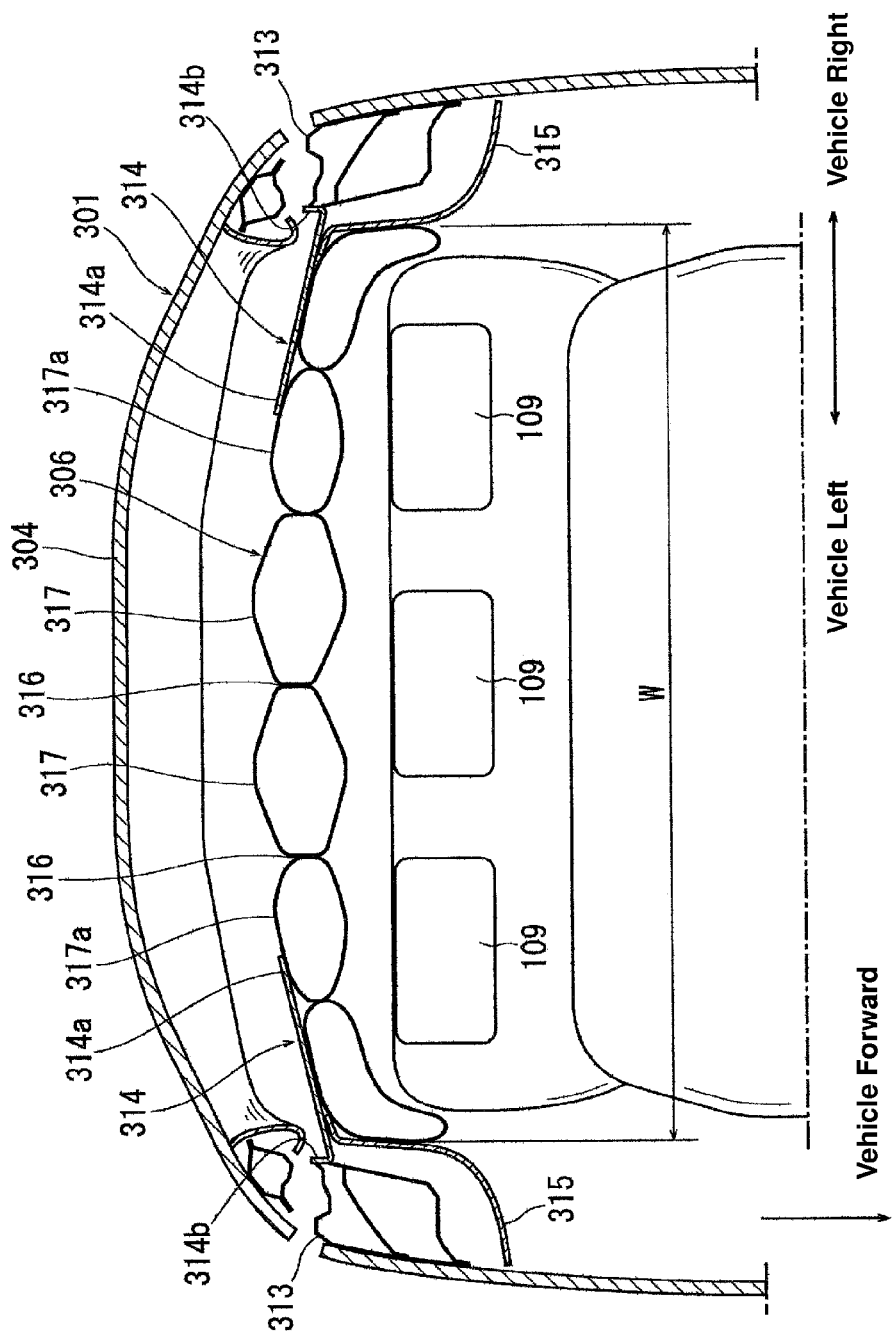
FIG. 6 is a sectional view taken along line X6-X6 of FIG. 5.

These split cylindrical portions 317 . . . increase an inflation rigidity of the airbag 306 properly, and the width W, in the vehicle width direction, of the airbag 306 can be shorter than the width (not illustrated) of the non-inflation of that. That is, as shown in FIGS. 5 and 6, the airbag 306 inflates separately from each other with the split cylindrical portions 317 . . . , so that the entire width W in the vehicle width direction becomes shorter.

Further, since the connecting tether member 314 is fixed to the turn portion 312 at the midway position of the airbag 306 at its one end 314a (see FIG. 3), this one end 314a moves to the position of the second split cylindrical portion 317a from the outside which corresponds to the turn portion 312 when the airbag 306 inflates. The connecting tether member 314 falls inwardly around the other end 314b (see FIG. 5) and supports the airbag 306.

The entire width W of the airbag 306 becomes shorter by its inflation as described above, so that a tension in the vehicle width direction occurs at the connecting tether member 314. Accordingly, a tension line TL which extends in the vehicle width direction can be securely generated at a specified position connecting the attachment positions (313a, 313a) of the right and left connecting tether members 314, 314 to the D pillar 313 at the airbag 306 as shown in FIG. 5.

Figure 11:
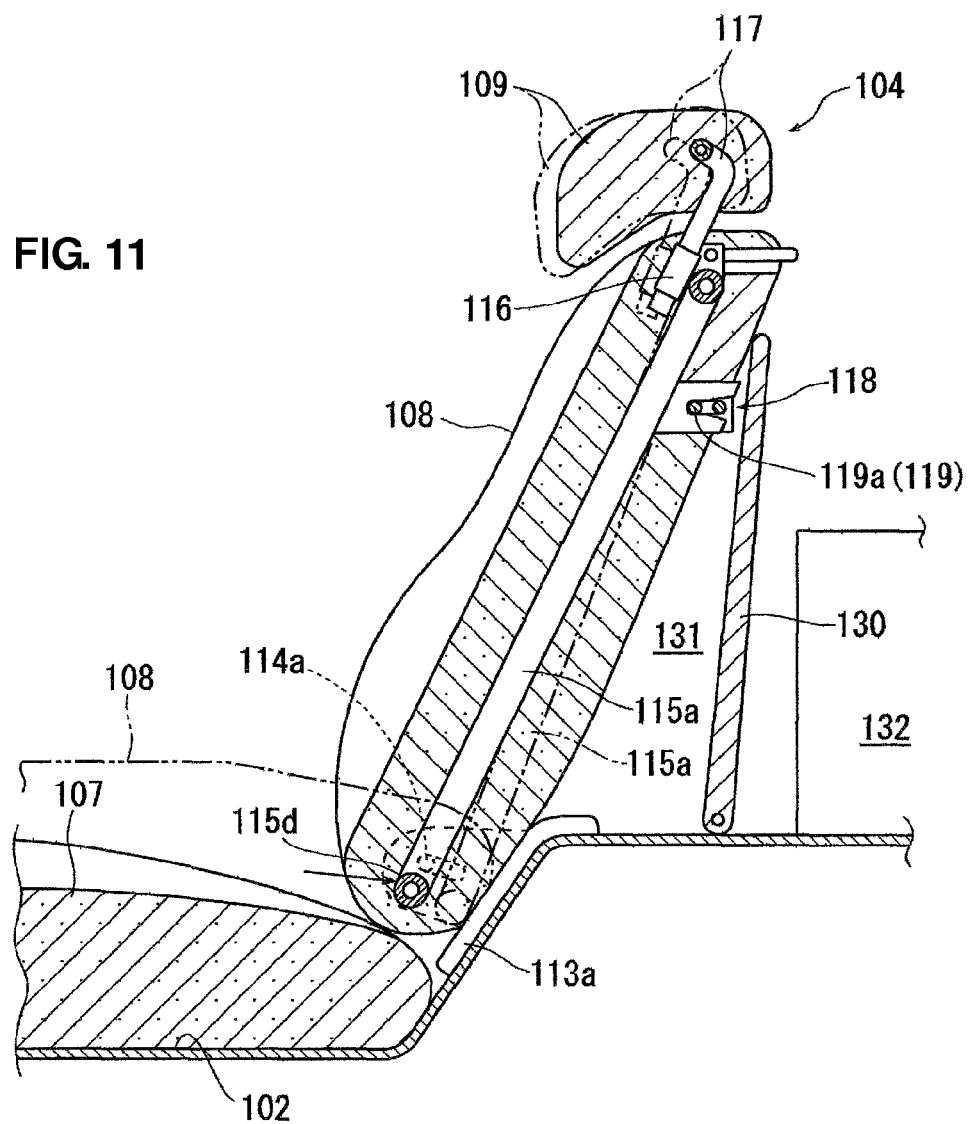
FIG. 11 is a sectional view taken along line X11-X11 of FIG. 7.

Meanwhile, a partition wall 130 is provided in the baggage room 106 so as to partition a front portion from a rear portion as shown in FIGS. 1 and 11. A lower end portion of the partition wall 130 is pivotally supported at a bottom portion of the baggage room 106, and an upper-end side of the partition wall 130 is biased in a direction of making it contact the seatback 108 by a spring means, not illustrated. In this case, an allowance space 131 to allow a rearward move of the upper portion of the headrest support structure body 111 is formed between the partition wall 130 and the seatback 108. Thereby, as shown in FIG. 11, in case a baggage 132 is located just behind the seatback 108, even if this baggage 132 is moved forwardly by the rear collision of the vehicle 101, the allowance space 131 is secured by the partition wall 130. Accordingly, the rearward move of the lower portion of the headrest support structure body 111 is not hindered (i.e., not poor operation). Of course, the upper side of the partition wall 130 is biased toward the seatback 108, so in case the seatback 108 is rotated forwardly to expand the baggage room 106, the partition wall 130 falls down accordingly and the partition wall 130 forms the bottom face of the enlarged space of the baggage room 106.

Since the front-row seat 103 is movable in the vehicle longitudinal direction along a seat rail 133 on the floor panel 102, the seatback 134 is not connected to the vehicle-body side wall 105.

Figure 12:
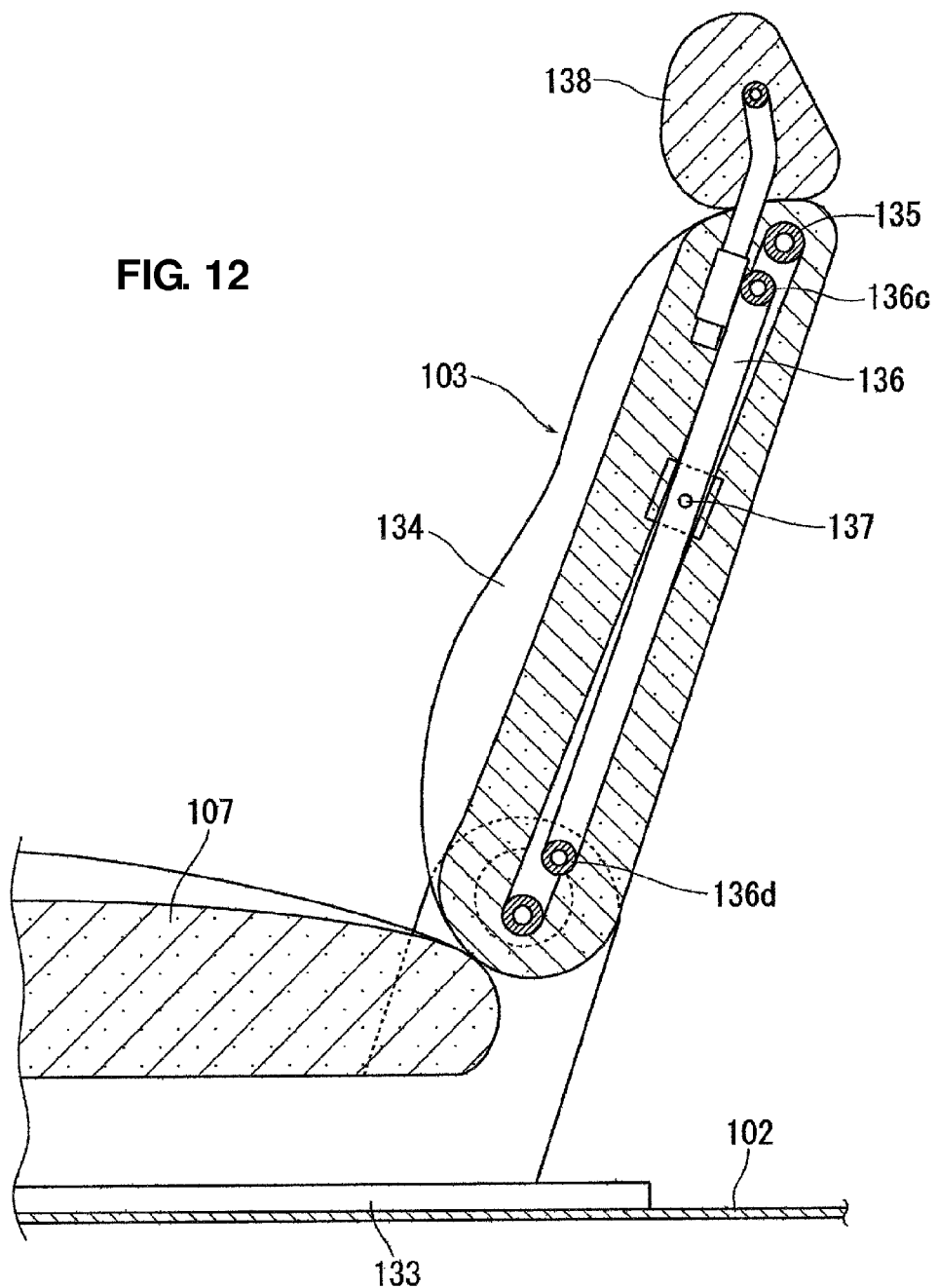
FIG. 12 is a vertical side view showing a structure of a front-row seat.

Accordingly, a reinforcing structure body 135 which is made of a circular-pipe-made seatback frame and a headrest support structure body 136 are arranged inside the seatback 134 of the front-row seat 103 as shown in FIG. 12. Herein, the reinforcing structure body 135 is arranged along a contour of the seatback 134, and the headrest support structure body 136 is supported at a support axis 137 so as to rotate relative to the reinforcing structure body 135. Thus, in the rear collision of the vehicle 101, the lower frame portion 136d of the headrest support structure body 136 as the pressure-receiving portion is pushed rearwardly through the rearward move of the passenger. In accordance with this, the headrest support structure body 136 rotates around the support axis 137, and the headrest 138 attached to an upper frame portion 136c of the headrest support structure body 136 is moved forwardly to support the passenger's head portion securely. Herein, a spring, not illustrated, is disposed between the reinforcing structure body 135 and the headrest support structure body 136, so that when the load does not operate against the lower frame portion 136d of the headrest support structure body 136, the headrest support structure body 136 is retuned to its original position.

As described above, in the seat for passenger 104 according to the first embodiment, the headrest 109 and the seatback 108 are moved forwardly in the rear collision of the vehicle 101, so that the space between the headrest 109 and the seatback 108 is expanded. Thereby, the airbag 306 can be inflated deeply and securely. Further, the passenger's head portion is securely received by the forwardly-moving headrest 109, so that the passenger's head portion can be protected effectively.

Embodiment 2

Figure 13:
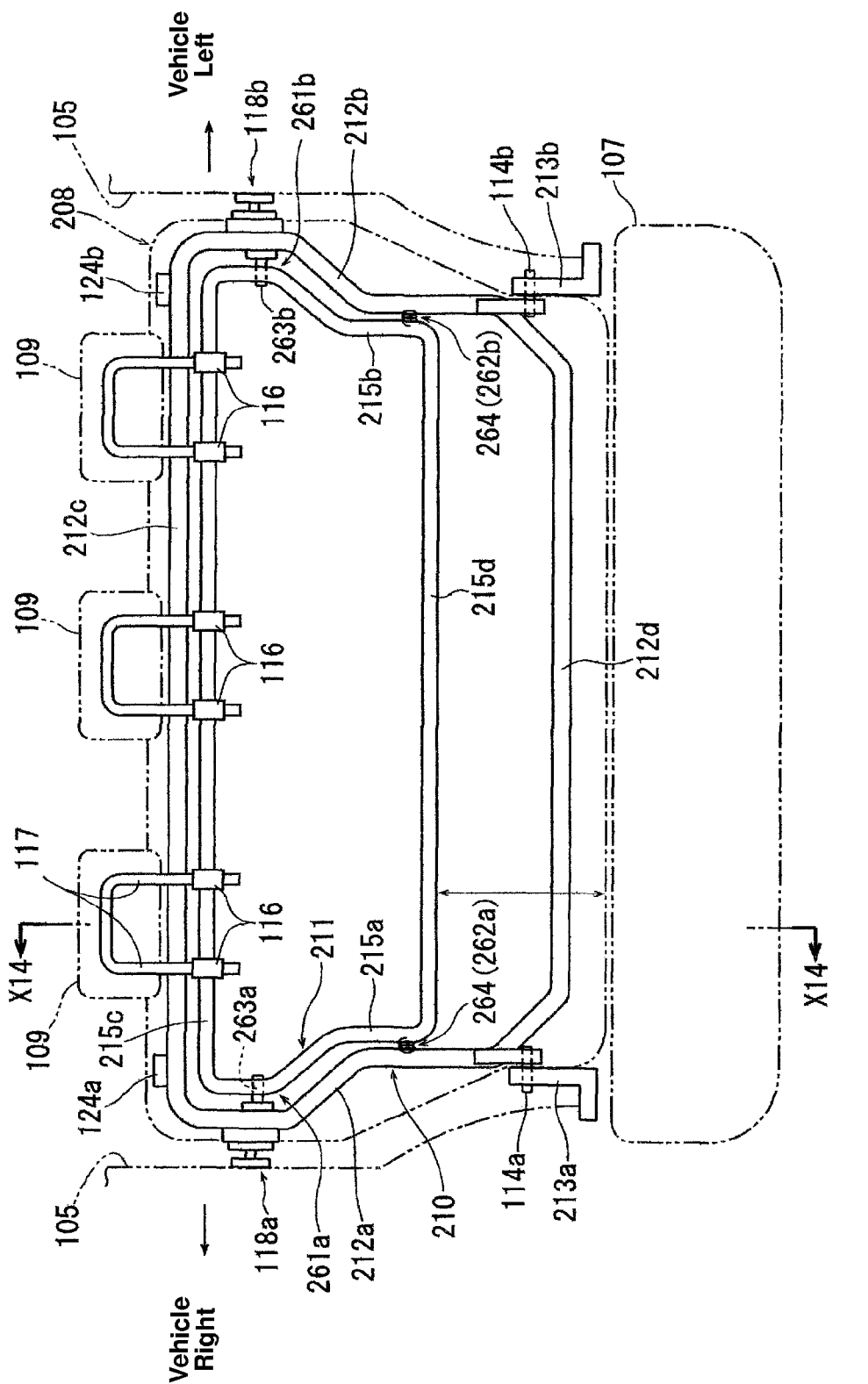
FIG. 13 is an elevational view showing an inter structure of a seat for passenger according to a second embodiment.
Figure 14:
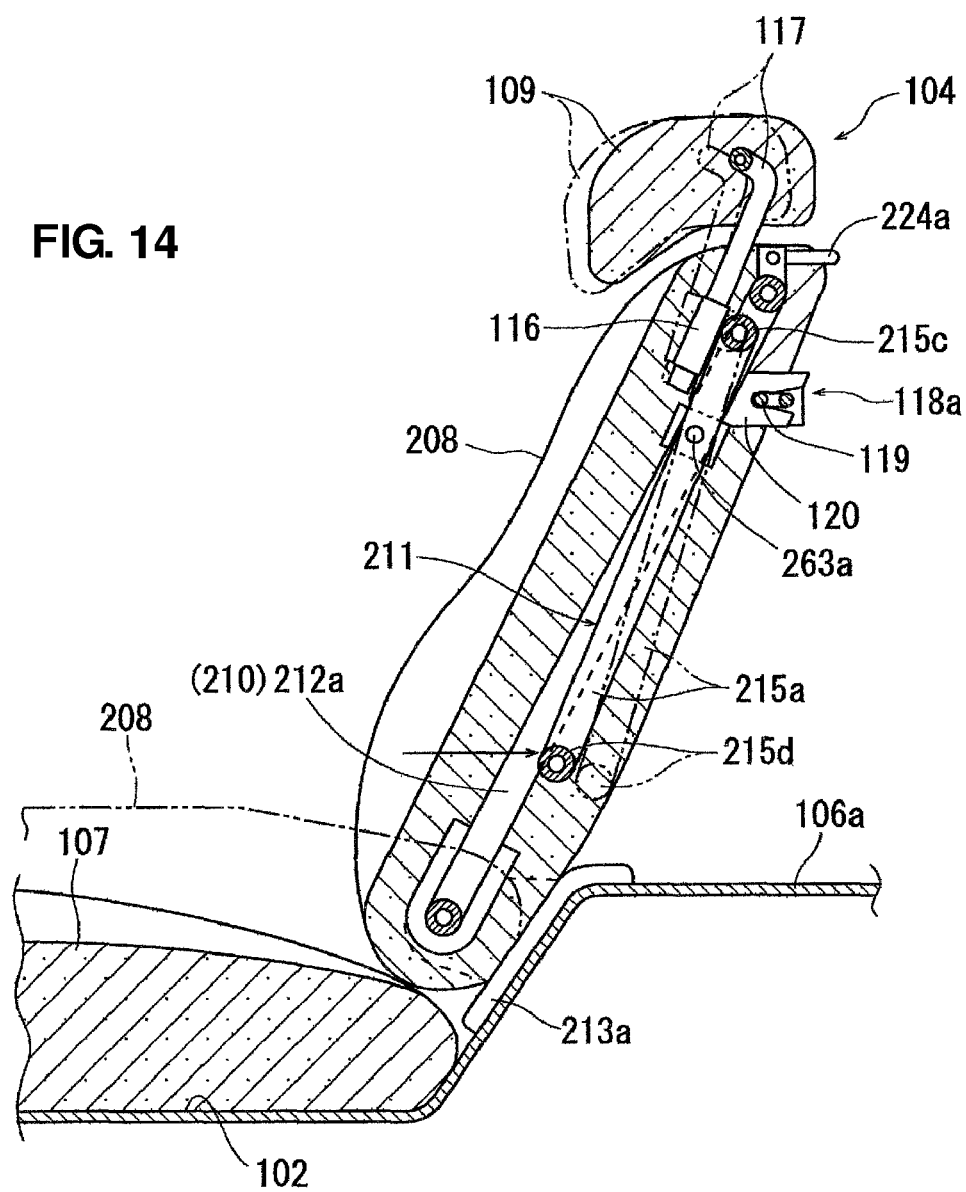
FIG. 14 is a sectional view taken along line X14-X14 of FIG. 13.

FIGS. 13 and 14 show a second embodiment. Herein, the same structure elements as those of the above-described first embodiment are denoted by the same reference characters, descriptions of which are omitted.

The second embodiment shows a modified example of the seatback structure. In the second embodiment, as shown in FIG. 13, a reinforcing structure body 210 and a headrest support structure body 211 are arranged inside a common seatback 208 which is common to the common seat cushion 107. The reinforcing structure body 210 is arranged along the contour of the seatback 208 so as to reinforce an area from a lower portion to an upper portion of the seatback 208. This reinforcing structure body 210 is made of a circular-pipe-made seatback frame (the same reference numeral 210 is used) in the present embodiment, and this seatback frame 210 comprises a pair of right-and-left side frame portions 212a, 212b, an upper frame portion 212c which interconnects upper end portions of the pair of right-and-left side frame portions 212a, 212b, and a lower frame portion 212d which interconnects lower end portions of the pair of right-and-left side frame portions 212a, 212b.

Lower portions of the side frame portions 212a, 212b of the reinforcing structure body 210 are pivotally supported at the support axes 114a, 114b via seat brackets 213a, 213b, and the right and left seat brackets 213a, 213b are fixed to the floor panel 102. Thus, the reinforcing structure body 210 is rotatable around the supper axes 114a, 114b. Further, the side frame portions 212a, 212b of the reinforcing structure body 210 are connected to and supported at the vehicle-body side wall 105 via the connecting members 118a, 118b within a range between its middle portion, in the vertical direction, and its upper end portion when the seatback 208 is in the rising state for use. Thereby, the seatback 208 can be held in the normal use state.

As shown in FIG. 13, the above-described headrest support structure body 211 is made of a circular-pipe-made seatback frame, and arranged in the reinforcing structure body 210 so as to extend along its frame portions 212a-212d. Thus, the headrest support structure body 211 comprises a pair of right-and-left side frame portions 215a, 215b, an upper frame portion 215c which interconnects upper end portions of the pair of side frame portions 215a, 215b, and a lower frame portion 215d which interconnects lower end portions of the pair of side frame portions 215a, 215b as well.

In the second embodiment, the lower frame portion 215d constitutes the pressure-receiving portion of the present invention. Accordingly, the lower frame portion 215d extends over the entire width of the seatback 208 at a specified position below the connecting members 118a, 118b. Further, the pair of side frame portions 215a, 215b and the upper frame portion 215c constitute the connection portion of the present invention in the second embodiment. Thus, the pair of side frame portions 215a, 215b and the upper frame portion 215c have a connection relationship with the lower frame portion 215d constituting the pressure-receiving portion, three sets of holding cylinders 116 are provided at the upper frame portion 215c, and the support bars 117 of each of the headrests 109 are inserted into and held by the holding cylinders 116.

Further, support mechanisms 261a, 261b and original-state return mechanisms 262a, 262b of the headrest support structure body 211 are associated with the side frame lower portions 215a, 215b of the connection portion as the headrest moving mechanism portion, in addition to the above-described connecting members 118a, 118b, as shown in FIG. 13. The support mechanism 261a (261b) has a support axis 263a (236b) at the side frame portion 212a (212b) of the reinforcing structure body 210. An upper portion of the side frame portion 215a (215b) of the headrest support structure body 211 is pivotally supported at the support axis 263a (263b). In this case, the support axis 263a (263b) is located substantially at the same level (height position) as the connecting member 118a (118b) and directed inwardly in the vehicle width direction. Thereby, the headrest support stricture body 211 is rotatably connected to the vehicle-body side wall 105 via the reinforcing structure body 210 and the connecting member 118a (118b). The original-state return mechanism 262a (262b) has a spring 264 between the side frame portion 212a (212b) of the reinforcing structure body 210 and the side frame portion 215a (215b) of the headrest support structure body 211 and biases the side frame portion 215a (215b) with this spring 264 so that the side frame portion 215a (215b) is located along the side frame portion 212a (212b). Accordingly, when no load acts on the lower frame portion 215d, the situation returns to its original-state returning situation (that is, the situation where the side frame portion 215a (215b) is located along the side frame portion 212a (212b)).

As described above, according to the second embodiment, when the specified rearward load (see the right-directed arrow in FIG. 14) caused by the rearward move of the passenger in the vehicle rear collision acts on the lower portion (the lower frame portion 215d) of the headrest support stricture body 211, the lower portion of the headrest support structure body 211 moves (rotates) rearwardly around the rotational axis of the support axes 114a, 114b, and thereby the headrests 109 at the upper portion of the headrest support structure body 211 move forwardly. Accordingly, the passenger's head portion can be securely received by the headrest 109, and also the space between the headrests 109 and the back door 301 is expanded longitudinally, so that the airbag 306 can be properly inflated into the space between the headrest 109 and the back door 301. In this case, the lower portion of the reinforcing structure body 210 is supported at the seat brackets 213a, 213b and the support axes 114a, 114b, while the upper portion of the reinforcing structure body 210 is connected to the vehicle-body side wall 105 via the connecting members 118a, 118b so that the reinforcing structure body 210 cannot rotate longitudinally. Thereby, the rearward load caused by the rearward move of the passenger in the vehicle rear collision is made positively act on the lower frame portion 215d of the headrest support structure body 211, so that the rearward move of the lower frame portion 215d as the pressure-receiving portion can be promoted. Accordingly, the headrest can be moved forwardly promptly in the vehicle rear collision, so that the airbag 306 can be securely inflated into the space between the back door 301 and the headrests 109 and the passenger's head portion can be effectively protected.

The present invention should not be limited to the above-described embodiments, and any other modifications and improvements may be applied within the scope of a sprit of the present invention. For example, while the striker 119 is provided at the side panel of the vehicle-body side wall 105 and the lock bracket 120 is provided at the headrest support structure body 111 in the above-described embodiments, these members 119, 120 may be provided reversely. That is, the lock bracket 120 may be provided at the vehicle-body side wall 105 and the striker 119 may be provided at the headrest support structure body 111.

What is claimed is:
1. A rear structure of a vehicle, comprising:
a rear vertical-wall portion provided at a rear end portion of the vehicle;
a seat provided in front of said rear vertical-wall portion, the seat comprising a seatback and a headrest provided above the seatback;
an airbag device provided at an upper portion of the rear end portion of the vehicle and inflating an airbag toward a space between said seat and said rear vertical-wall portion in a vehicle rear collision;
a pressure-receiving portion provided at the seatback of said seat and receiving a load caused by a rearward move of a passenger seated in the seat in the vehicle rear collision;
a connection portion connecting said pressure-receiving portion and the headrest of said seat; and
a headrest-moving mechanism portion associated with said connection portion so as to allow a rearward move of said pressure-receiving portion in accordance with said rearward move of the passenger in the vehicle rear collision and move the headrest of said seat forwardly in accordance with said rearward move of the pressure-receiving portion,
wherein said seat comprises plural sitting portions in a vehicle width direction and plural headrests corresponding to the sitting portions, said pressure-receiving portion is common to any passenger seated on said plural sitting portions of the seat so as to receive the load caused by the rearward move of any one of the passengers seated in the seat, said connection portion is common to said plural headrests so as to connect said common pressure-receiving portion and the plural headrests of the seat, and said headrest-moving mechanism portion moves said plural headrests of the seat forwardly via said common connection portion when said common pressure-receiving portion receives the rearward load from any one of the passengers seated on the plural sitting portions of the seat in the vehicle rear collision.
2. The rear structure of a vehicle of claim 1, wherein said headrest-moving mechanism portion connects said connection portion and a vehicle body rotatably via a connecting member within a range between a middle portion, in a vertical direction, of the seatback and an upper end portion of the seatback when the seatback is in a rising state for use.
3. The rear structure of a vehicle of claim 1, wherein said headrest-moving mechanism portion connects said connection portion and a vehicle body rotatably via a connecting member within a range between a middle portion, in a vertical direction, of the seatback and an upper end portion of the seatback when the seatback is in a rising state for use.
4. The rear structure of a vehicle of claim 1, wherein a baggage room is provided behind said seat, a partition wall is provided behind the seat and in front of said baggage room, and a space to allow a rearward move of said pressure-receiving portion and/or said connection portion is provided between said partition wall and the seat.

* * * * *